United States Patent
Tsai

[19]

[11] Patent Number: 5,942,746
[45] Date of Patent: Aug. 24, 1999

[54] MULTI-LENSES OPTICAL DEVICE

[75] Inventor: Jenn-Tsair Tsai, Taipei Hsien, Taiwan

[73] Assignee: Mustek Systems, Inc., Taiwan

[21] Appl. No.: 09/056,596

[22] Filed: Apr. 7, 1998

[30] Foreign Application Priority Data

Aug. 11, 1997 [TW] Taiwan ................................. 86213600

[51] Int. Cl.[6] .............................. H04N 1/04; H04N 1/393
[52] U.S. Cl. ...................... 250/208.1; 250/234; 358/474; 358/497
[58] Field of Search ................................ 250/208.1, 234, 250/235, 236; 358/296, 450, 451, 474, 482, 483, 497

[56] References Cited

U.S. PATENT DOCUMENTS

| | | |
|---|---|---|
| 5,734,477 | 3/1998 | Tsai .......................................... 358/474 |
| 5,864,133 | 1/1999 | Tsai ....................................... 250/208.1 |

*Primary Examiner*—Edward P. Westin
*Assistant Examiner*—Kevin Pyo
*Attorney, Agent, or Firm*—Brown, Martin, Haller & McClain, LLP

[57] ABSTRACT

A multi-lenses optical device with high resolution is provided for converting an optical image into electronic signals. The multi-lenses optical device includes a focusing unit for focusing a plurality of sections of the optical image to correspondingly generate a plurality of focused image sections with the same ratio and having the same optical path length, a photoelectric conversion unit for converting the plurality of focused image sections into the electronic signals, a switching unit for sequentially having each one of the focused image sections or the optical image sections selected and having the selected image section transmitted to the photoelectric conversion unit, and a light-reflecting unit mounted between the photoelectric conversion unit and the focusing units for transmitting the plurality of image sections.

14 Claims, 6 Drawing Sheets

MULTI-LENSES OPTICAL DEVICE

FIELD OF THE INVENTION

The present invention is related to an optical device, and more particularly to a multi-lenses optical device.

BACKGROUND OF THE INVENTION

Image processing is often used for photography or movie. As we know, the scanner plays an indispensable role in this field. Increasing the resolution of a scanner is investigated hard in order to get more clear images, but high cost of a scanner with high resolution is not avoidable. The operating principle of the conventional scanner is shown in FIG. 1. An article is placed on the scanner to be scanned. The article is lit by a light source for generating an optical image 11. The optical image 11 of the article is focused on a charge coupled device 13 by a lens set 12, and then is converted to electronic signals to form digital data by the charge coupled device 13. For obtaining a higher resolution, the number of pixels for the charge coupled device 13 must be increased. However, the cost of the charge coupled device 13 is proportional to the square of the number of pixels for it. Requiring higher resolution will thus cost much since the cost of a charge coupled device 13 is a great part of the production cost of a scanner. Frankly speaking, it is difficult to spend lower cost for obtaining higher resolution in the first prior art.

Another method also has been developed to solve the problem of high-cost. Please refer to FIG. 2 showing the operating principle of a scanner according to the second prior art. The optical image of the scanned article is divided into two sections 211 and 212. There are many corresponding lens sets 221 and 222 and corresponding charge coupled devices 231 and 232 for the optical image sections 211 and 212 in this scanner. Different sections 211 and 212 are converted to electronic signals by the same steps as the first prior art by respective lens sets 221 and 222 and charge coupled devices 231 and 232. Finally, the electronic signals will be combined together to form a full image. Hence, the number of pixels for a charge coupled device is reduced, but the performance can be still maintained like that of the prior art. The cost can be reduced by this arrangement. However, the cost is proportional to the number of charge coupled devices. Accordingly, we still hope to make an improvement in increasing resolution and decreasing cost.

SUMMARY OF THE INVENTION

An objective of the present invention is to provide a multi-lenses optical device with high resolution which has a photoelectric conversion unit with less pixels.

In accordance with the present invention, a multi-lenses optical device, converting an initial image into electronic signals, includes a plurality of focusing units for focusing a plurality of sections of the initial image respectively to correspondingly generate a plurality of focused image sections magnified with the same ratio and having the same optical path length, a photoelectric conversion unit for converting the plurality of focused image sections to the electronic signals, a switching unit for sequentially having each one of the plurality of focused image sections selected and having the selected focused image section transmitted to the photoelectric conversion unit at an instant, and a light-reflecting unit mounted between the photoelectric conversion unit and the focusing units for transmitting the plurality of focused image sections to the photoelectric conversion unit.

In accordance with another aspect of the present invention, each of the plurality of focusing units is a lens set wherein all the lenses are respectively mounted in specific locations for generating the plurality of focused image sections magnified with the same ratio.

In accordance with another aspect of the present invention, the photoelectric conversion unit is a charge coupled device.

In accordance with another aspect of the present invention, the light-reflecting unit preferably includes a first dichroic mirror for transmitting the plurality of focused image sections to the photoelectric conversion unit, and a plurality of dichroic mirrors or reflective mirrors for transmitting the plurality of focused image sections from the respective focusing units to the first dichroic mirror.

In accordance with another aspect of the present invention, the light-reflecting unit further includes another reflective mirror for equalizing the optical path length.

In accordance with another aspect of the present invention, the light-reflecting unit further includes another dichroic mirror for equalizing the optical path length.

In accordance with another aspect of the present invention, the switching unit is preferably a light shade set.

In accordance with another aspect of the present invention, the light shade set preferably includes a movable light shade.

In accordance with another aspect of the present invention, the movable light shade may be mounted within light paths of the initial image for shading the plurality of focusing units from the respective initial image sections except a selected initial image section corresponding to the selected focused image section. Besides, the movable light shade may be mounted between the light-reflecting unit and the plurality of focusing units for shading the light-reflecting unit from the focused image sections except the selected one. Moreover, the movable light shade also may be mounted within the light-reflecting unit.

In accordance with another aspect of the present invention, the light shade set preferably includes a rotatable light shade mounted within the light-reflecting unit and it is rotated to be in different directions for shading the photoelectric conversion unit from the plurality of focused image sections except the selected one.

In accordance with another aspect of the present invention, the number of the plurality of focusing units is from 2 to 4.

In accordance with the present invention, a multi-lenses optical device for converting an initial image into electronic signals, includes a focusing unit for focusing a plurality of sections of the initial image to generate a plurality of focused image sections, a photoelectric conversion unit for sequentially converting the plurality of focused image sections into the electronic signals, a switching unit for sequentially having each one of the plurality of initial image sections selected and having the selected section transmitted to the focusing unit at an instant, and a light-reflecting unit mounted within light paths of the initial image for transmitting the plurality of said initial image sections to the focusing unit with the same optical path lengths.

In accordance with another aspect of the present invention, the switching unit is a light shade set.

In accordance with another aspect of the present invention, the light shade set preferably includes a movable light shade. It may be mounted within the light paths of the initial image for shading the light-reflecting unit from the plurality of sections of the initial image except the selected initial image section. Another choice is to mount the movable light shade within the light-reflecting unit for shading the focusing unit from the plurality of sections of the initial image except the selected initial image section.

The present invention may best be understood through the following description with reference to the accompanying drawings, in which:

DETAILED DESCRIPTION OF THE PREFERRED EMBODIMENT

The present invention will be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 1:
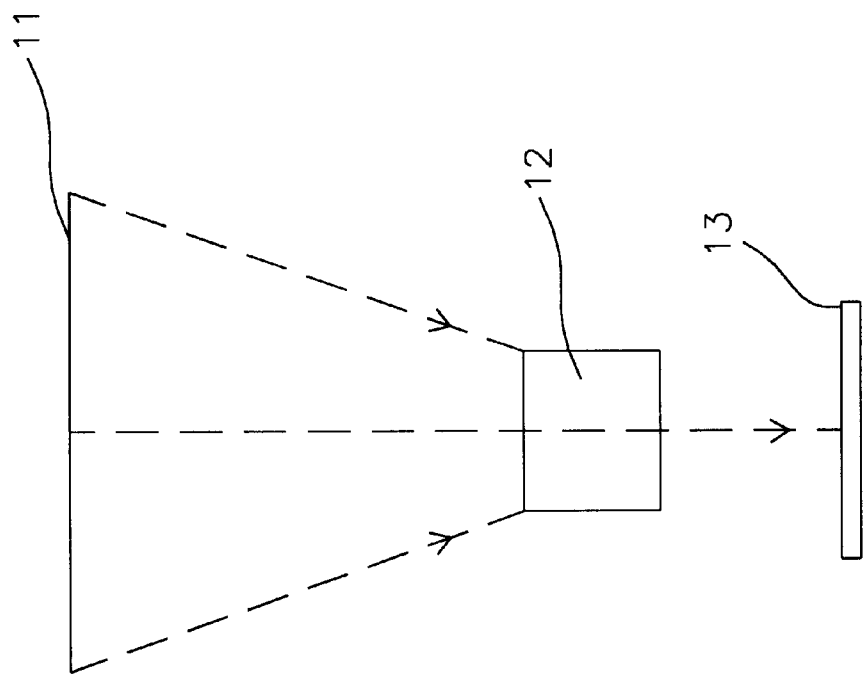
FIG. 1 is a schematic diagram showing the operation of a conventional scanner.
Figure 2:
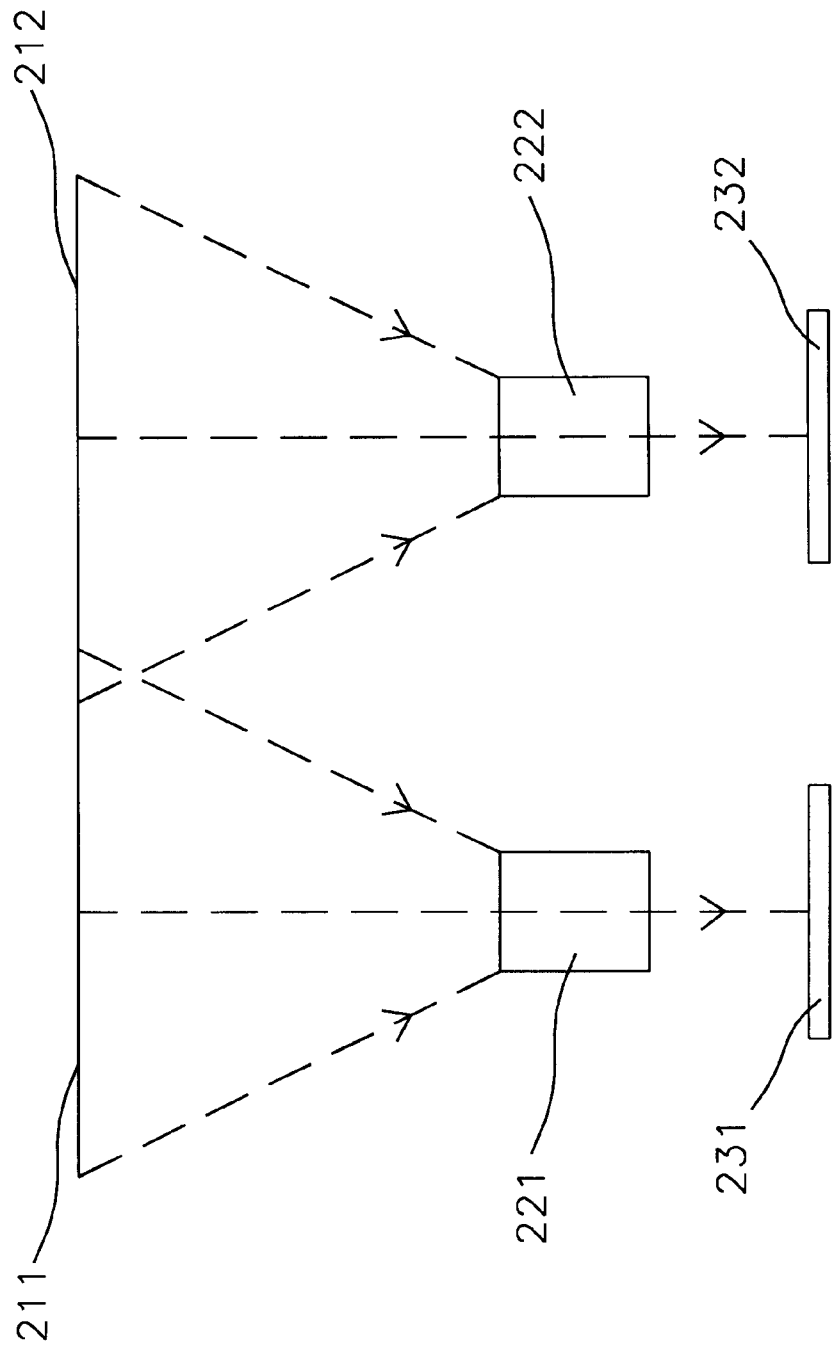
FIG. 2 is a schematic diagram showing the operation of another conventional scanner.
Figure 3:
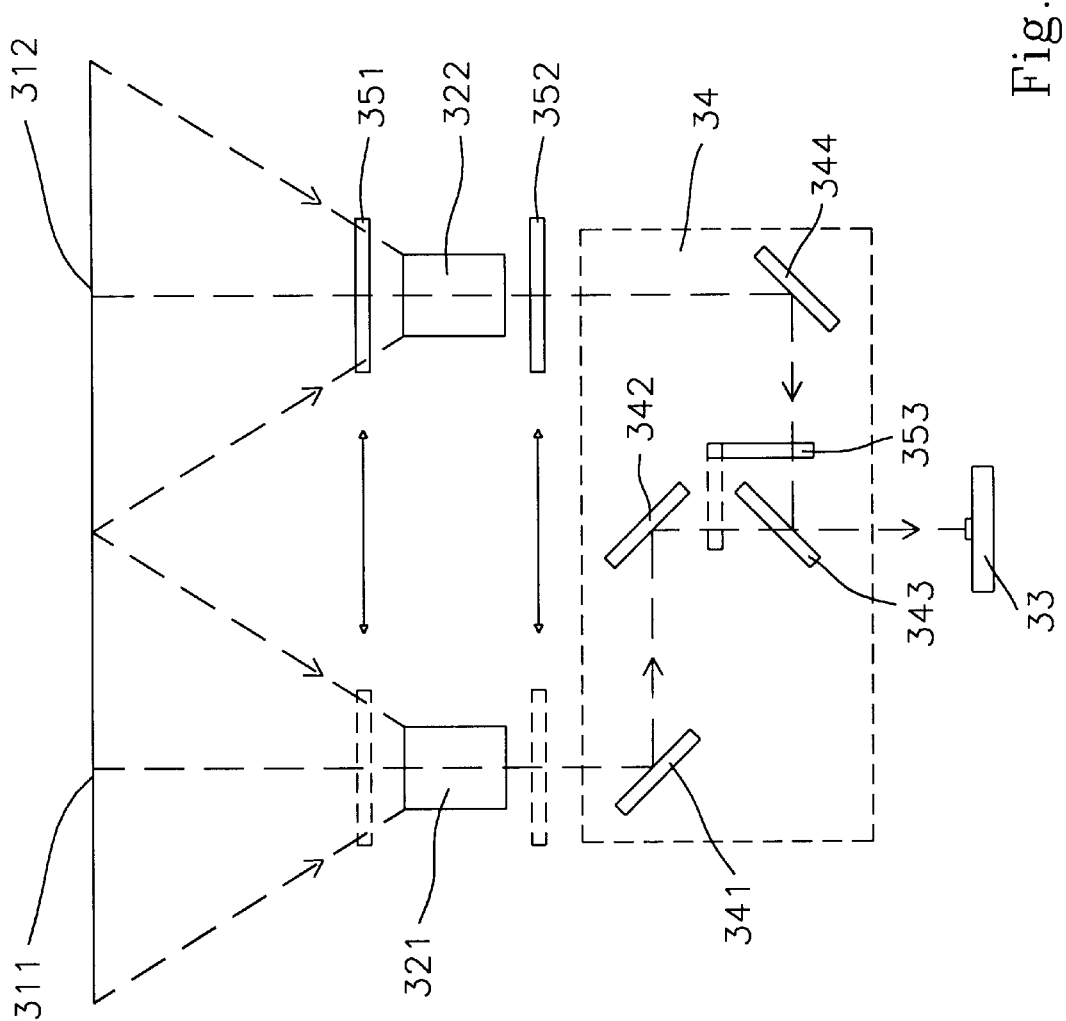
FIG. 3 is a schematic diagram showing some preferred embodiments of the operation of a scanner according to the present invention.

Please refer to FIG. 3 which is a schematic diagram showing some preferred embodiments of a scanner according to the present invention. It is found that the scanner has two lens sets 321 and 322 which are mounted in specific locations so that the ratio of image distance to object distance of lens set 321 is the same as that of lens set 322 according to the lens maker's equation. In this diagram, the image distance and object distance of the lens set 321 is the same as that of the lens set 322. Hence, the magnifying power of lens set 321, defined as the ratio of image distance to object distance, is the same as that of lens set 322. An article is placed on the scanner and is lit by a light source to generate an initial image. The initial image is divided into two sections 311 and 312 to be scanned sequentially. The light-reflecting unit 34 includes a dichroic mirror 343 and three reflective mirrors 341, 342, and 344. The so-called dichroic mirror can transmit or reflect light at both sides. The reflectance and the transmittance at each side of a dichroic mirror can be modified according to the requirement of users. The first initial image section 311 is focused by the lens set 321 for generating a first focused image section, while the second initial image section 312 is focused by the other lens set 322 for generating a second focused image section. Since the magnifying powers of the lens sets 321 and 322 are the same, the full image will not be distorted when these two focused image sections are combined together. There are three light shades as shown in this figure. One is a movable light shade 351, another is a movable light shade 352, and the other is a rotatable light shade 353. Only one of them is needed in a preferred embodiment. The light shades are defined as "switching unit" because they are used for obstructing undesired initial image sections or undesired focused image sections, or as "switching" among the lens sets to make only one initial image section reach the corresponding lens set or have only one focused image section sensed by the charge coupled device. There are three preferred embodiments shown in FIG. 3 and they are respectively described in brief in the following paragraphs.

Embodiment 1

The movable light shade 351 is selected as the switching unit. At first, the movable light shade 341 is moved to be located in front of lens set 322 so that the initial image section 312 can not be received by the lens set 322. The initial image section 311 is focused by the lens set 321 to generate a first focused image section. The first focused image section is transmitted from the lens set 321 to the charge coupled device 33 through the reflective mirror 341, the reflective mirror 342, and the dichroic mirror 343 in sequence. Thereafter, the first focused image section is received and converted to electronic signals by the charge coupled device 33. Second, the movable light shade 351 is moved leftwardly to be located in front of lens set 321. The initial image section 311 is obstructed by the movable light shade 351 so that it can not be focused by the lens set 321. The initial image section 312 is focused by the lens set 322 to generate a second focused image section. The second focused image section is transmitted to the charge coupled device 33 by way of the reflective mirror 344 and the dichroic mirror 343 in sequence. Thereafter, it is converted to electronic signals by the charge coupled device 33. At last, both of the electronic signals generated from the first and second instances will be combined together. It is noted that the optical path length of image distance plus object distance corresponding to lens set 321 is the same as that corresponding to the other lens set 322.

Embodiment 2

In this preferred embodiment, the movable light shade 351 is displaced by another movable light shade 352 mounted between the light-reflecting unit 34 and the lens sets 321 and 322. At first, the movable light shade 352 is moved to be located in back of lens 322 so the second focused image section generated by the lens set 322 is obstructed. Only the first focused image section generated by the lens set 321 can be transmitted to the charge coupled device 33 by way of the reflective mirrors 341 and 342 and dichroic mirror 343 in sequence to be converted to electronic signals. Second, the movable light shade 352 is moved leftwardly to be located in back of lens set 321. The second focused image section, but not the first focused image section, is transmitted to the charge coupled device 33 through the reflective mirror 344 and dichroic mirror 343 to be converted to electronic signals. The following steps are the same as those described in the above-mentioned preferred embodiment and will not be explained tautologically.

Embodiment 3

In stead of the movable light shade 352, the rotatable light shade 353 is equipped within the light-reflecting unit 34. First of all, the rotatable light shade 343 is rotated to be in a vertical direction between the dichroic mirror 343 and the reflective mirror 344 to obstruct the second focused image section. The first focused image section is transmitted from the lens set 321 to the charge coupled device 33 through the light-reflecting unit 34. Thereafter, the rotatable light shade 353 is rotated to be in a horizontal direction to obstruct the first focused image section. Only the second focused image section is transmitted to the charge coupled device 33 through the light-reflecting unit 34. The other steps and the light path of image sections are already shown in the detailed description of the preceding preferred embodiments and are not illustrated again.

It should be noted that the words "leftwardly", "horizontal", and "vertical" are not essential. They are just used for illustrating these embodiments according to the diagram. The light shades can be rotated to be in any directions when the undesired image sections are completely obstructed. Moreover, the scanning sequence of the initial image sections also can be modified for the manufactures and users.

Figure 4:
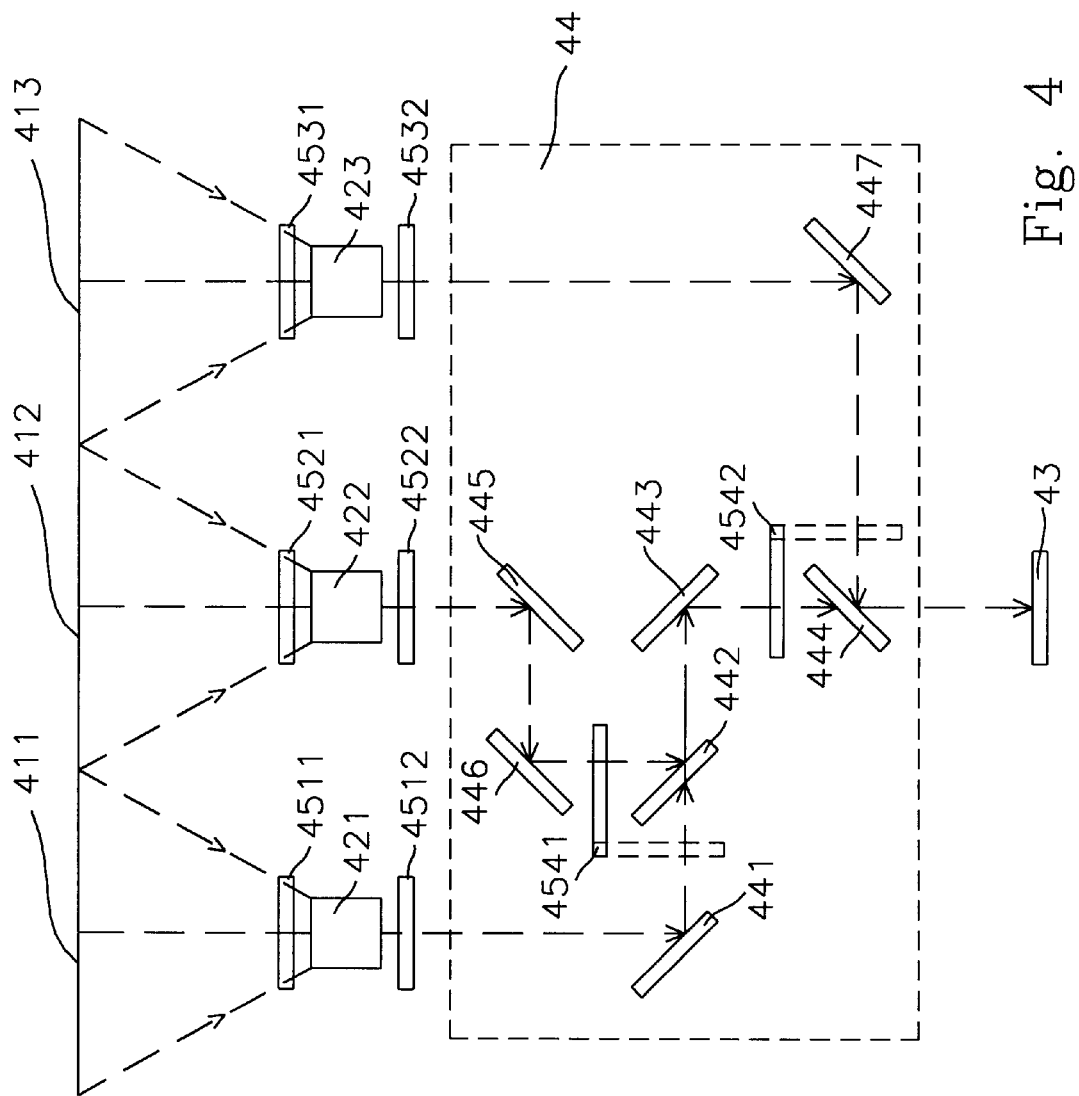
FIG. 4 is a schematic diagram showing another preferred embodiments of the operation of a scanner according to the present invention.

The number of divided initial image sections can be increased to meet one's requirement. The number from two to four is especially preferred. Their operating functions are similar to those as described above. Please refer to FIG. 4 which is a schematic diagram showing another preferred embodiments of a scanner according to the present invention. The initial image is divided into three sections consisting of a left initial image section 411, a middle initial image section 412, and a right initial image section 413. They are focused by the lens sets 421, 422, and 423 respectively for generating a left focused image section, a middle focused image section, and a right focused image section correspondingly. The light-reflecting unit 44 includes two dichroic mirrors 442 and 444 and five reflective mirrors 441, 443, 445, 446, and 447. There are two types of applications in this diagram. One utilizes the movable light shades, and the other utilizes the rotatable light shades. The operating processes are described in brief as follows.

Embodiment 4

When utilizing movable light shades, each lens set is accompanied by only one movable light shade. In other words, only one of the movable light shades 4511 and 4512 is adopted to match the lens set 421. By the same token, only one of the movable light shades 4521 and 4522, and only one of the movable light shades 4531 and 4532 are needed. All possible movable light shades shown in the diagram are not essential. They are shown in order to indicate all the possibilities. We suppose that the movable light shades 4511, 4521, and 4531 are adopted. At the first step, the movable light shade 4511 is dislodged from the lens set 421 (hereafter called "non-obstructive state"), and other movable light shades 4521 and 4531 are provided in front of lens sets 422 and 423 (hereafter called "obstructive state"). The left initial image section 411 is focused by the lens set 421 for generating a left focused image section, but other initial image sections 412 and 413 are obstructed. The left focused image section is transmitted from the lens set 421 to the charge coupled device 43 through the reflective mirror 441, dichroic mirror 442, reflective mirror 443, and dichroic mirror 444 in sequence, and then is converted to electronic signal. At the second step, the movable light shade 4511 is moved back to the obstructive state, another movable light shade 4521 is in the non-obstructive state, and the other movable light shade 4531 keeps in the obstructive state. The middle focused image section generated by the lens set 422 responding to the middle initial image section 412 is converted to electronic signals by the charge coupled device 43 after it is transmitted through the reflective mirror 445, the reflective mirror 446, the dichroic mirror 442, the reflective mirror 443, and the dichroic mirror 444 in sequence. At the third step, the movable light shade 4511 keeps in the obstructive state, another movable light shade 4521 is moved back to the obstructive state, and the other movable light shade 4531 is in the non-obstructive state. The right initial image section 413 is focused by lens 423 to generate a right focused image section, but the other initial image sections 411 and 413 are obstructed. After the right initial image section is transmitted through the reflective mirror 447 and the dichroic mirror 444, it is received by the charge coupled device 43 and is converted to electronic signals. All the electronic signals generated at any steps are combined together to form an entire image which will be processed later. The magnifying powers of lens sets 421, 422, and 423 must be the same such that the formed image is not distorted.

Embodiment 5

In stead of movable light shades, two rotatable light shades 4541 and 4542 are mounted within the light-reflecting unit 44. At first, the rotatable light shade 4541 is rotated to be in a horizontal direction between the reflective mirror 446 and the dichroic mirror 442, and the other rotatable light shade 4542 is rotated to be in a vertical direction between the dichroic mirror 444 and the reflective mirror 447. Hence, only the left focused image section generated by the lens set 421 responding to the left initial image section 411 can be received and converted by the charge coupled device 43. Second, the rotatable light shade 4541 is rotated to be in a vertical direction between the reflective mirror 441 and the dichroic mirror 442, and the other rotatable light shade 4542 keeps in the vertical direction between the dichroic mirror 444 and the reflective mirror 447. Hence, only the middle focused image section generated by the lens set 422 in response to the middle initial image section 412 can be received and converted by the charge coupled device 43. At last, the rotatable light shade 4542 is rotated to be in a horizontal direction between the reflective mirror 443 and the dichroic mirror 444. Hence, only the right focused image section generated by the lens set 423 corresponding to the right initial image section 413 can be received and converted by the charge coupled device 43. The light paths of image sections and the following steps are the same as those described in EMBODIMENT 4.

Figure 5:
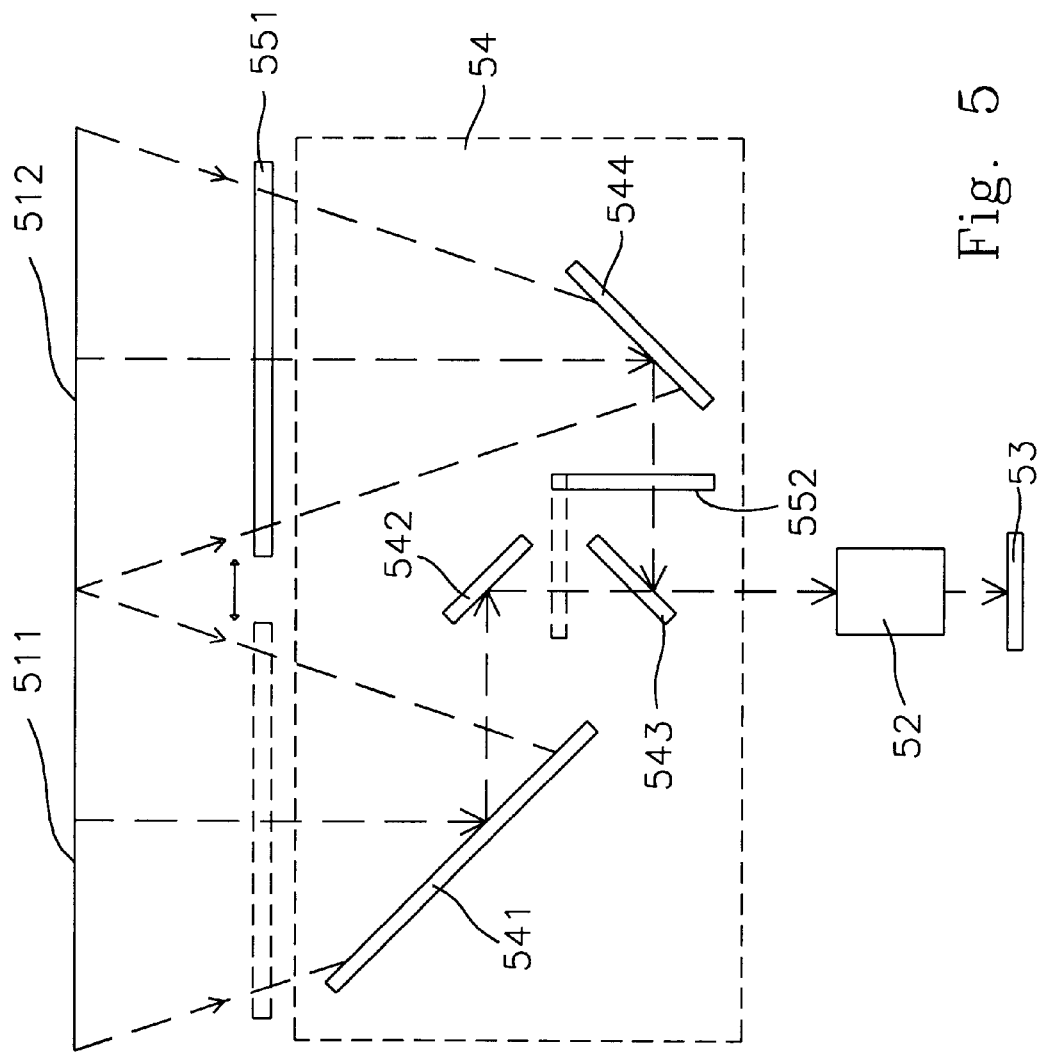
FIG. 5 is a schematic diagram showing other preferred embodiments of the operation of a scanner according to the present invention.

Please refer to FIG. 5 showing other preferred embodiments of the present invention. The light-reflecting unit 54 including a dichroic mirror 543 and three reflective mirrors 541, 542, and 544 is mounted in the light path of initial image for transmitting the initial image sections 511 and 512 to the only one lens set 52. Only one of the movable light shade 551 and the rotatable light shade 552 is required so there are two preferred embodiments shown in this diagram.

Embodiment 6

The movable light shade 551 is equipped in the scanner. First of all, the movable light shade 551 is moved to be located in the light path of the second initial image section 512 so the second initial image section 512 is obstructed by the movable light shade 551. The first initial image section 511 is transmitted to the lens set 52 through the reflective mirrors 541, 542 and the dichroic mirror 543 in sequence, and is focused by the lens set 53 to generate a first focused image section. The first focused image section is then received by the charge coupled device 53 and is converted to electronic signals. Afterward, the movable light shade 551 is moved leftward to be located in the light path of the first initial image section 511 so that the first initial image section 511 is obstructed, but not the second initial image section 512. Therefore, the second initial image section 512 is transmitted to the lens set 52 by way of the reflective mirror 544 and the dichroic mirror 543. The second initial image section 512 is focused by the lens set 52 for generating a second focused image section. The second focused image is then converted to electronic signals by the charge coupled device 53. All the generated electronic signals will be combined together to form a full image shown on the computer screen. It should be noted that the optical path length of the initial image sections must be the same, so the magnifying ratio of the corresponding focused image sections is the same. Therefore, the obtained full image shown on the computer screen will not be distorted.

Embodiment 7

If the rotatable light shade 552 is selected as the switching unit, the scanning process is described as follows. At first, the rotatable light shade 552 is rotated to be in a vertical direction between the dichroic mirror 543 and the reflective mirror 544. Thus, the second initial image section 512 is obstructed, but not the first initial image section 511. Thereafter, the first initial image section 511 is transmitted to the lens set 52 by the light-reflecting unit 54. Afterward, the rotatable light shade 552 is rotated to be in a horizontal direction between the reflective mirror 542 and the dichroic mirror 543. The first initial image section 511 is obstructed, but not the second initial image section 512. Thereafter, the second initial image section 512 is transmitted to the lens set 52 by the light-reflecting unit 54. The light paths of initial image sections and other steps have been shown in EMBODIMENT 6.

Figure 6:
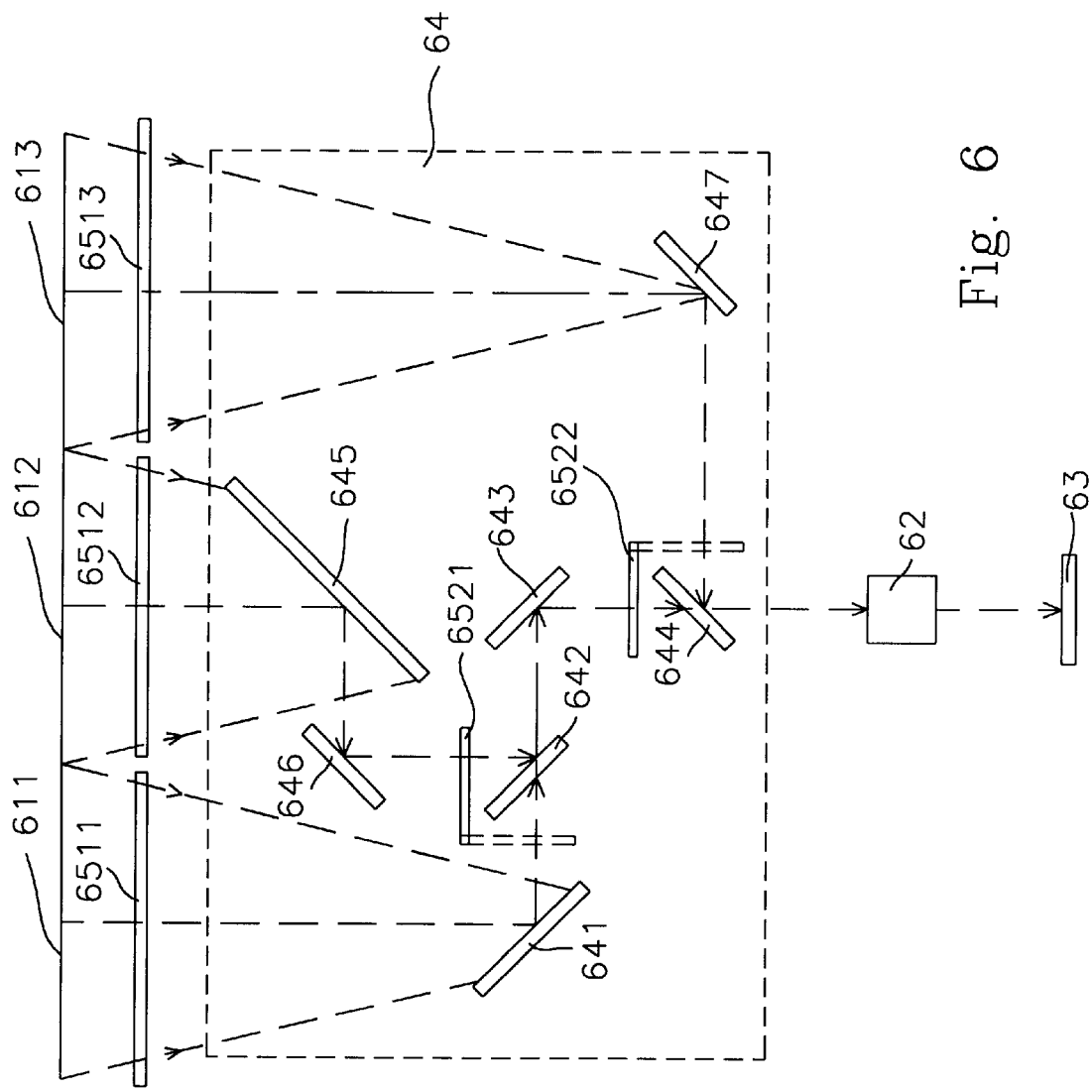
FIG. 6 is a schematic diagram showing other preferred embodiments of the operation of a scanner according to the present invention.

The number of divided initial image sections can be increased to meet one's requirement, especially from two to four. Their operating functions are similar to those as described above. Please refer to FIG. 6 showing other preferred embodiments of a scanner according to the present invention. The initial image is divided into three sections. A left initial image section 611, a middle initial image section 612, and a right initial image section 613 are required to be scanned one by one. The light-reflecting unit 64 includes two dichroic mirrors 642 and 644 and five reflective mirrors 641, 643, 645, 646, and 647. There are two types of applications in this diagram. Among these applications, one utilizes movable light shades, and the other utilizes rotatable light shades. The scanning processes are described in brief as follows.

Embodiment 8

The movable light shades 6511, 6512, and 6513 are mounted within the light path of the initial image. At first, the movable light shade 6511 is dislodged from the light path of the left initial image section 611 (hereafter called "non-obstructive state"), and other movable light shades 6512 and 6513 are placed in the light paths of the middle and right initial image sections 612 and 613 respectively (hereafter called "obstructive state"). The left initial image section 611 is transmitted to the lens set 62 by way of the reflective mirror 641, the dichroic mirror 642, the reflective mirror 643, and the dichroic mirror 644 in sequence. The left initial image section 611 is focused by the lens set 62 to generate a left focused image section. The left focused image section is transmitted to the charge coupled device 63 and is converted to electronic signals. Second, the movable light shade 6511 is moved back to the obstructive state, another movable light shade 6512 is in the non-obstructive state, and the other movable light shade 6513 keeps in the obstructive state. The middle initial image section 612, but not the left initial image section 611 and the right initial image section 613, is transmitted to the lens set 62. After being transmitted to the lens set 62 through the reflective mirror 645, the reflective mirror 646, the dichroic mirror 642, the reflective mirror 643, and the dichroic mirror 644, the middle initial image section 612 is focused by the lens set 62 for generating a middle focused image section which will be converted to electronic signals by the charge coupled device 63. Afterward, the movable light shade 6511 keeps in the obstructive state, another movable light shade 6512 is moved back to be in the obstructive state, and the other movable light shade 6513 is in the non-obstructive state. The right initial image section 613 is transmitted to the lens set 62 by way of the reflective mirror 647 and the dichroic mirror 644, but other initial image sections 611 and 612 are obstructed. After the right initial image section 613 is focused by the lens set 62 for generating a right focused image section, it is received by the charge coupled device 63 and is converted to electronic signals. At last, all the electronic signals generated in the first, second, and third instances will be combined together to form a full image which will be processed later. The optical path lengths of the initial image sections must be the same so that the magnifying ratio of the corresponding focused image sections will not be changed. Therefore, the obtained full image is not distorted.

Embodiment 9

In stead of the movable light shades, two rotatable light shades 6521 and 6522 are mounted within the light-reflecting unit 64. At first, the rotatable light shade 6521 is rotated to be in a horizontal direction between the reflective mirror 646 and the dichroic mirror 642, and the other rotatable light shade 6522 is rotated to be in a vertical direction between the dichroic mirror 644 and the reflective mirror 647. Hence, only the left initial image section 611 is transmitted to the lens set 62. Second, the rotatable light shade 6521 is rotated to be in a vertical direction between the reflective mirror 641 and the dichroic mirror 642, and the other rotatable light shade 6522 keeps in the vertical direction between the dichroic mirror 644 and the reflective mirror 647. Hence, only the middle initial image section 612 can be transmitted to the lens set 62. Thereafter, the rotatable light shade 6522 is rotated to be in a horizontal direction between the reflective mirror 643 and the dichroic mirror 644. Hence, only the right initial image section 613 can be transmitted to the lens set 62. The light paths of each image sections and other relevant steps are the same as those described in EMBODIMENT 8 and will not be explained again. The words "left", "middle", and "right" in the forgoing paragraphs should not be used to limit the scope of the present invention, because they are only used to illustrate the preferred embodiment more clearly. Likewise, The operating sequence also can be modified to make the method more convenient for the manufacturers and users.

The feature of the present invention is that the initial image is divided into more sections to be scanned in sequence. Less charge coupled devices or less pixels for a charge coupled device are required for this case without reducing resolution. Additional light-reflecting unit and switching unit required for the embodiment according to the present invention are relatively cheaper than the charge coupled device. Therefore, the cost can be highly reduced without influencing the quality. For example, if an image of a 600 dpi (dot per inch) resolution is required, a charge coupled device 0f 600 dpi must be equipped in the scanner according to the prior art. However, according to the present invention, a charge coupled device of 300 dpi is sufficient when the initial image is divided into two sections. Moreover, a charge coupled device of 200 dpi can provide an image data with a resolution of 600 dpi if the initial image is divided into three sections. Besides, another feature of the present invention is that the optical elements such as lens sets, light-reflecting unit, and the charge coupled device are immobily fixed in the housing. The method of the present invention is to obstruct the undesired image sections substituted for capturing the desired image section. The precision of the scanner according to the present invention keeps unerring because the positions of other optical elements are not affected by rotating or moving the light shades. The other driving elements for the precision according to the present invention are not necessary so that the size and the production cost can be reduced significantly. Accordingly, the present invention really conforms to the genius of modem technology.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-lenses optical device for converting an initial image into electronic signals, comprising:
    a plurality of focusing units for focusing a plurality of sections of said initial image respectively to correspondingly generate a plurality of focused image sections magnified with the same ratio and having the same optical path length;
    a photoelectric conversion unit for converting said plurality of focused image sections to said electronic signals;
    a switching unit for sequentially having each one of said plurality of focused image sections selected and having said selected focused image section transmitted to said photoelectric conversion unit at an instant; and
    a light-reflecting unit mounted between said photoelectric conversion unit and said plurality of focusing units for transmitting said plurality of focused image sections to said photoelectric conversion unit.

2. A multi-lenses optical device according to claim 1 wherein each of said plurality of focusing units is a lens set, a number of said plurality of focusing units being from 2 to 4.

3. A multi-lenses optical device according to claim 2 wherein said lens sets are respectively mounted in specific locations for generating said plurality of focused image sections magnified with said same ratio.

4. A multi-lenses optical device according to claim 1 wherein said photoelectric conversion unit is a charge coupled device.

5. A multi-lenses optical device according to claim 1 wherein said light-reflecting unit comprises a first dichroic mirror for transmitting said plurality of focused image sections to said photoelectric conversion unit.

6. A multi-lenses optical device according to claim 5 wherein said light-reflecting unit further comprises a plurality of transmitting units corresponding to said plurality of focusing units for transmitting said plurality of focused image sections from said respective focusing units to said first dichroic mirror, each of said transmitting units being one of a dichroic mirror and a reflective mirror.

7. A multi-lenses optical device according to claim 6 wherein said light-reflecting unit further comprises another reflective mirror for equalizing said optical path length.

8. A multi-lenses optical device according to claim 6 wherein said light-reflecting unit further comprises another dichroic mirror for equalizing said optical path length.

9. A multi-lenses optical device according to claim 1 wherein said switching unit is a light shade set.

10. A multi-lenses optical device according to claim 9 wherein said light shade set comprises a movable light shade.

11. A multi-lenses optical device according to claim 10 wherein said movable light shade set is mounted within light paths of said plurality of sections of said initial image for shading said plurality of focusing units from said respective sections of said initial image except a selected section of said initial image corresponding to said selected focused image sections.

12. A multi-lenses optical device according to claim 10 wherein said movable light shade is mounted between said light-reflecting unit and said plurality of focusing units for shading said light-reflecting unit from said plurality of focused image sections except said selected focused image section.

13. A multi-lenses optical device according to claim 10 wherein said movable light shade is mounted within said light-reflecting unit.

14. A multi-lenses optical device according to claim 9 wherein said light shade set comprises a rotatable light shade mounted within said light-reflecting unit and being rotated to be in different directions for shading said photoelectric conversion unit from said plurality of focused image sections except said selected focused image section.

* * * * *